(No Model.)

J. J. FOX.
CAMERA SHUTTER.

No. 366,947. Patented July 19, 1887.

WITNESSES
Will B. Powell.
Will. H. Graeff.

INVENTOR
Joseph J. Fox,
By Connolly Bros.,
Attorneys.

UNITED STATES PATENT OFFICE.

JOSEPH J. FOX, OF BRYN MAWR, ASSIGNOR TO JAMES W. QUEEN & CO., OF PHILADELPHIA, PENNSYLVANIA.

CAMERA-SHUTTER.

SPECIFICATION forming part of Letters Patent No. 366,947, dated July 19, 1887.

Application filed August 12, 1886. Serial No. 210,729. (No model.)

*To all whom it may concern:*

Be it known that I, JOSEPH J. FOX, a citizen of the United States, residing at Bryn Mawr, in the county of Philadelphia and State of Pennsylvania, have invented certain new and useful Improvements in Camera-Shutters; and I do hereby declare the following to be a full, clear, and exact description of the invention, reference being had to the accompanying drawings, which form part of this specification, in which—

Figure 1:
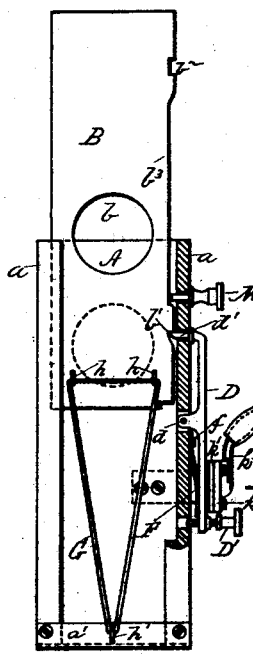
Figure 2:
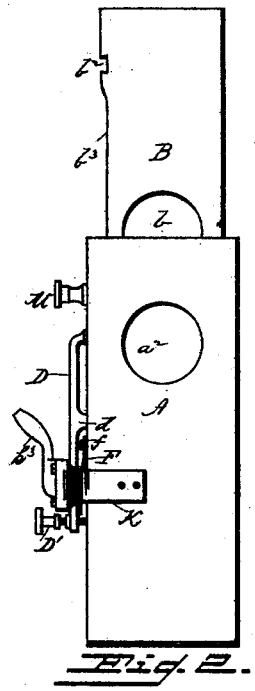
Figures 3, 5:
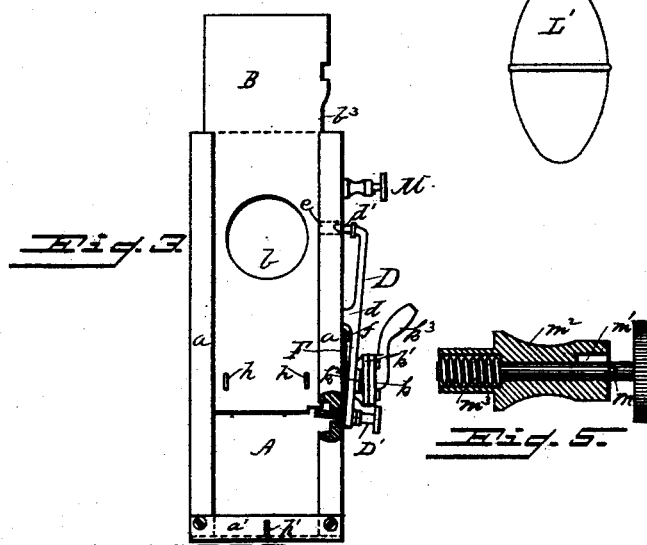
Figure 4:
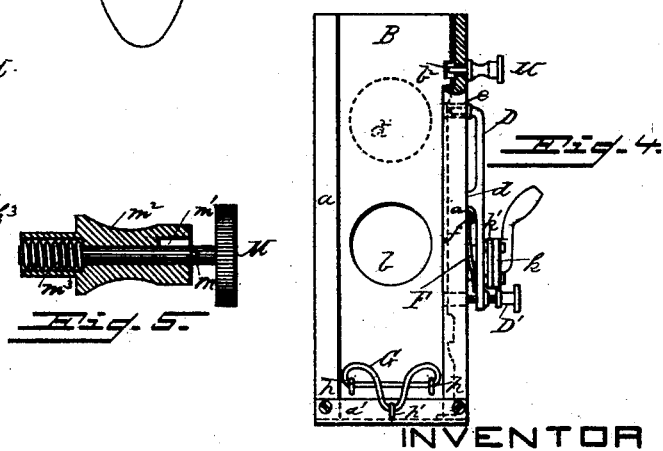

Figure 1 is a front elevation of shutter-and-ball connection, partly in section, showing slide or drop elevated and parts arranged for instantaneous exposure. Fig. 2 is a rear elevation of shutter with slide elevated. Fig. 3 is a front elevation of shutter, partly in sections, showing slide arrested after dropping to position for time exposure. Fig. 4 is a front elevation, partly in section, showing slide dropped after instantaneous exposure. Fig. 5 is a vertical detail section, enlarged, of a detent.

My invention has relation to camera shutters or drops; and my improvements have for their principal object to provide a construction of shutter or drop capable of use for either instantaneous or time exposure.

My invention consists in the peculiar construction and combinations of parts hereinafter fully described and specifically claimed.

Referring to the accompanying drawings, A indicates a frame-piece having side guides, $a\,a$, for a slide or drop, B, and a cross-piece, $a'$, which limits the movement of or forms a stop or rest for said slide. The frame A has an opening, $a^2$, and the slide B has a similar opening, $b$, registering with the opening $a^2$ when said slide is in a certain position relative to the frame—i. e., the position it occupies when exposure is being made, being the position shown in Fig. 3. At other times the slide B is in such position that its opening $b$ is above the opening $a^2$, as shown in Fig. 1—that is, when elevated—or it is below the latter—that is, when lowered—as shown in Fig. 4. Said slide is sustained in its elevated position by a lever, D, fulcrumed at $d$ and having its upper end, or a pin, $d'$, thereon, projecting through an opening, $e$, in the guide $a$, and held in contact with said slide by a spring, F, fastened at $f$ and exerting pressure against said lever. The slide B has a notch, $b'$, one side of which is beveled or inclined, the other forming a shoulder which rests upon the pin $d'$. When the lower end of the lever D is pressed toward the frame A, overcoming the resistance of spring F, the slide B is released from engagement of the pin $d'$, and is free to move downwardly. It will so move by gravity if the frame A and slide B are vertically arranged, and its movement may be assisted by a rubber band, G, or equivalent elastic connection secured to hooks or eyes $h\,h'$ on the slide and cross-piece $a'$, respectively, this assistance being desirable only for instantaneous exposures.

To produce pressure on and movement of the lever D so as to release the slide, I provide a bracket, K, secured to the frame A and comprising two plates, $k\,k'$, the latter having an opening covered by a rubber or flexible diaphragm, $k^2$, the former having a pipe or hollow stem, $k^3$, which connects with a tube, L, having at its outer end a compressible ball or bulb, L'.

By compressing the ball or bulb L' the diaphragm $k^2$ is distended against the lever D, moving the pin $d'$ away from shoulder $b$ and allowing slide B to drop or be moved until its lower edge strikes the piece $a'$, or until otherwise arrested, as hereinafter set forth. For instantaneous exposure in photography the slide B should move its full limit, or until it meets the piece $a'$. To prevent recoil after such movement, there is provided a spring pin or detent, M, which enters a notch, $b^2$, in the slide B when the latter has fully descended, as shown in Fig. 4.

For time exposure it is necessary to cause the slide B to be arrested in its descent and to dwell awhile with the openings $a^2$ and $b$ in registration or exact opposition. To provide a means for such arrest, the lower end of lever D is provided with a screw or detent, D'. When said screw is turned into the proper or sufficient extent, as shown in Fig. 3, and the lever D is pressed toward the frame A in the manner already described, said screw (which passes freely through an aperture in the guide $a$) opposes the descent of the slide and holds the latter with its opening $b$ in registry with the opening $a^2$ as long as compression continues on the bulb or ball L'. When such compression ceases, the lever D is moved outwardly, and, the screw D' retiring from the path of descent of the slide B, the latter falls. By turning back the screw D' to the position shown in Fig. 1 it will not oppose the slide B in its descent, so that by the mere adjustment of one screw D' the slide may be operated to drop all the way to obtain an instantaneous exposure, or will be arrested in its descent or movement and held for any desired period sufficient for time exposure and afterward allowed to fall.

In operating the shutter for time exposures the detent M should be drawn outwardly and held from contact with the slide, and this may be effected by providing it with a cross-pin, $m$, which ordinarily moves in an internal groove, $m'$, in the barrel $m^2$, in which said detent fits and which forms the holder for said detent and its impelling-spring $m^3$. By drawing the detent outwardly and turning it around so as to move the cross-pin out of and away from the groove and allow it to impinge on the end of the barrel $m^2$, said detent will be held out of contact with the slide.

The object of holding the detent M out of contact with the slide is to avoid its frictional contact on the latter, which might prevent the descent of the slide B, as the rubber band is not desirable to use for time exposure, and should then be omitted. If said band be omitted, the friction of the detent M, if the latter were not held out of contact, might impede the movement of the slide.

By making the detent at the lower end of the lever D (shown as a screw in the drawings) in the form of a rigid pin, or non adjustable, the shutter will then be adapted for use for time exposures only; but whether said detent be adjustable or non-adjustable the operation or manipulation of my shutter for time exposure is characteristic and peculiar in this, that by compressing the ball or bulb the lever is moved at its upper end away from the slide and at its lower end into the path of said slide, so that the one impulse of compression, resulting in one movement of the lever, both releases the slide to allow it to drop or move and temporarily arrests it, and relaxation of compression allows the slide to drop or move after temporary arrest, or by simply compressing a ball the slide is dropped and held for exposure as long as compression continues, and by simply releasing compression of said ball said slide is allowed to further drop to shut off the light.

To prevent the detent M from rubbing against the edge of slide or drop B, the latter is cut away or recessed, as shown at $b^3$, and this cut or recess also prevents contact by the detent $d'$ with the edge of the slide or drop after the lever D has been released. Such cut or recess should be sufficiently long or so extended that when the detent M is in notch $b^2$, as shown in Fig. 4, the upper shoulder or terminal of recess $b^3$ will be above detent $d'$, and the latter therefore out of contact with the slide or drop.

What I claim as my invention is—

1. In a camera-shutter, the combination, with a frame, A, of a drop or slide, B, and a lever, D, having at one end a detent or pin, $d'$, which holds the slide in an elevated position, and having at its other end a screw which may be adjusted to either arrest or to clear said slide in its descent or movement, thereby enabling the shutter to be used for time or instantaneous exposures, either or both, substantially as shown and described.

2. The combination, with a camera, of a frame, A, a slide or drop, B, having recesses near each end, a lever, D, having pins on each end, a diaphragm, $k^2$, pipe $k^3$, tube L, and bulb L', all constructed and arranged substantially as shown and described.

3. In a camera-shutter, the combination, with a frame, A, and a slide or drop, B, of a detent, M, adapted to engage the said slide or drop after its descent or movement and prevent recoil, substantially as shown and described.

4. In a camera-shutter, the combination, with a frame, A, and slide or drop B, of a detent for preventing recoil of said slide, said detent being adjustable to move and hold it out of contact with the slide, substantially as shown and described.

In testimony that I claim the foregoing I have hereunto set my hand this 21st day of June, 1886.

JOSEPH J. FOX.

Witnesses:
WILL H. POWELL,
R. DALE SPARHAWK.